US005380960A

United States Patent [19]

Fontaine

[11] Patent Number: 5,380,960

[45] Date of Patent: Jan. 10, 1995

[54] PROCESS FOR THE PREPARATION OF FILMS OR DIAPHRAGMS FOR ACOUSTIC APPLICATIONS

[75] Inventor: Pierre Fontaine, Herblay, France

[73] Assignee: Audax Industries, Chateau-du-Loir, France

[22] PCT Filed: Jul. 22, 1991

[86] PCT No.: PCT/FR91/00603

§ 371 Date: Jun. 23, 1993

§ 102(e) Date: Jun. 23, 1993

[87] PCT Pub. No.: WO92/02108

PCT Pub. Date: Feb. 6, 1992

[30] Foreign Application Priority Data

Jul. 23, 1990 [FR] France ................................ 90 09369

[51] Int. Cl.$^6$ .............................................. B32B 31/04

[52] U.S. Cl. .................................... 181/167; 181/169; 181/170; 156/242

[58] Field of Search ................ 156/242; 181/167, 169, 181/170

[56] References Cited

U.S. PATENT DOCUMENTS

| | | | |
|---|---|---|---|
| 3,003,191 | 10/1961 | Luth | 181/169 |
| 3,153,463 | 10/1964 | Novak . | |
| 3,858,680 | 1/1975 | Tsuge et al. | 181/167 |
| 4,352,407 | 10/1982 | Tsukagoshi et al. | 181/167 |
| 5,180,785 | 1/1993 | Uryu et al. | 181/169 |

FOREIGN PATENT DOCUMENTS

| | | | |
|---|---|---|---|
| 0087177 | 8/1983 | European Pat. Off. . | |
| 0322587 | 7/1989 | European Pat. Off. . | |
| 1445262 | 5/1986 | France . | |
| 55-48226 | 4/1980 | Japan . | |
| 172100 | 10/1983 | Japan | 181/167 |
| 59-93325 | 5/1984 | Japan . | |
| 62-48531 | 3/1987 | Japan . | |
| 215293 | 9/1988 | Japan | 181/167 |
| 1384716 | 2/1975 | United Kingdom . | |

OTHER PUBLICATIONS

Patent Abstracts of Japan, vol. 12, No. 40 (C-474), 62-190210 published Aug. 20, 1987.

Patent Abstracts of Japan, vol. 8, No. 8 (E-221) (1445), 58-172100 published Aug. 8, 1983.

*Primary Examiner*—Caleb Weston

*Attorney, Agent, or Firm*—Curtis, Morris & Safford

[57] ABSTRACT

Process for the preparation of films or diaphragms for acoustic applications, exhibiting improved vibration properties, and films or diaphragms obtained by this process, particularly diaphragms for electro-mechanical transducers, particularly for loudspeakers. The invention has for an object a process for preparing films or diaphragms for acoustic applications exhibiting improved vibration properties, consisting in preparing a dispersion, in a liquid, of at least one macropolymer, especially at least one synthetic macropolymer having at least 30,000 atoms in a molecule, adding, to the dispersion, a product capable of swelling said macropolymer and of transforming said dispersion in a gel of similar material, and drying sale gel or similar material by evaporating substantially all the liquid from the gel or similar material, thereby obtaining the film or diaphragm in the porous solid slate. NO DRAWING.

10 Claims, No Drawings

PROCESS FOR THE PREPARATION OF FILMS OR DIAPHRAGMS FOR ACOUSTIC APPLICATIONS

The invention concerns films or diaphragms for acoustic application that have to exhibit predetermined vibration properties, and particularly diaphragms for electromechanical transducers capable of converting an electric current received into a sound transmission (loudspeakers) or, conversely, a sound wave received into electric current transmitted (microphones), particularly for loudspeakers, and also concerns the process for the preparation of such films or diaphragms.

Present diaphragms of electro-mechanical transducers fail to meet all the increasingly severe requirements engendered by the constant improvement of the electronic portion of high-fidelity sound systems, particularly since the introduction of digital techniques.

This is because the present diaphragms do not behave at the high frequencies as perfectly rigid pistons, but exhibit natural modes and frequencies that cause reductions of the passband, irregularities in the passband, hangovers and high mechanical overpressures or stresses.

In order to broaden the passband, to reduce the irregularities, the hangovers and the overpressures or stresses, it is necessary to provide a diaphragm exhibiting increased mechanical rigidity, greater internal losses, lower density and a more appropriate sound propagation velocity.

Similar problems arise for other acoustic applications, for example for materials used in the construction of loudspeaker baffles and musical instruments.

It is a specific object of the invention to provide improved films or diaphragms for various acoustic applications.

To achieve this, the invention has firstly as an object a process for preparing a porous film or diaphragm having improved vibration properties for acoustical uses, particularly a diaphragm for loudspeaker, consisting in the succession of the following steps:

a) preparing a dispersion, in a liquid, of at least one macropolymer containing at least 30,000 atoms in a molecule;

b) adding, to said dispersion as prepared in phase (a), a swelling agent swelling said at least one macropolymer for dosing said dispersion to have the consistency of a gel, and c) evaporating substantially all said liquid contained in said dispersion which has been caused in phase (b), to have the consistency of a gel, whereby obtaining said porous film or membrane.

Advantageously said macropolymer is chosen in the group consisting in the polymers of methacrylic acid, the polymers of ethyl acrylate and the mixtures of these two polymers.

More particularly, said macropolymer is the product commercially called "Appretan 9110" constitued by a mixture of about 70% of a polymer of methacrylic acid and about 30% of a polymer of ethyl acrylate.

On the other hand, the polyvinyl polymers can be constitued by the polymers of vinyl acetate and the polymers of vinyl alcohol and more generally by any polyvinylic polymers.

Another macropolymer which can be used advantageously within the scope of the invention is the cellulose or one of its derivatives.

As concerns the product added to the dispersion the following is preferably used:

a basic liquid, inorganic (as ammonia) or organic (as caustic soda) in case of a macropolymer of the polyacid type, water in case of a macropolymer of the polyalcohol type, for example of the poly(vinylalcohol type), ethyl acetate or tetrahydrofuran for a polyvinylic macropolymer.

The invention has also for an object a porous film or membrane with improved vibration properties for acoustic applications especially a membrane for loudspeaker, obtained by the above mentioned process.

Before drying, the gel can either be impregnated on fabrics (woven or non-woven) or roves of natural, artificial or synthetic fibers, or can constitute the bonding agent of such fibers, with the possibility of adding, in each case, fillers (carbon, ceramic, glass, graphite etc.).

The material thus obtained, once dried and having become porous, can then advantageously be thermoformed due to the flexibility of the dried material upon heating, and due to the thermo-bonding of the dried gel or similar material on fabrics or fiber roves.

The invention will now be described in greater detail, with a few illustrative examples, that are in no way limitative, for implementing the invention.

A) Examples of preparation of a gel usable to make films or diaphragms, for acoustic applications, exhibiting improved vibration properties.

EXAMPLE 1

Use is made of "Appretan 9110", which is an aqueous dispersion of a mixture of macropolymers consists of about 70% of a polymer of methacrylic acid (or polymethacrylate) and about 30% of a polymer of ethyl acrylate, with a dry extract of 32,50% of the mixture of copolymers with respect to the dispersion.

This aqueous dispersion is diluted in water (12% of dispersion in water) and ammonia (at 22° Baumé) is added dropwise until a gel is obtained having a viscosity of 29 poiseuilles (290 poises), which is dried in hot air to cause the water and ammonia to evaporate.

EXAMPLE 2

The starting material is a 15% aqueous dispersion of polyvinyl acetate. It is deposited on a nylon fabric. The water is evaporated. The fabric, thus coated, is soaked in ethyl acetate.

This produces a gel with the consistency of honey, which is dried in hot air to cause the ethyl acetate to evaporate.

In the two examples, an increase in the sound transmission velocity is observed in the material, probably related to the opening and interlacing (cross linking) of the polymer chains.

The measurement of the velocity of sound in two samples, consisting of bars, measuring $10\times1\times0{,}5$ cm, in carbon fibers, cut and mixed with a 12% dilution of a mother liquor of "Appretan 9110" (dry extract: 32-50%), namely on the one hand a sample in which a gel has been formed according to example 1 by the addition of ammonia, and on the other hand a reference sample in which the mother liquor has not undergone any subsequent treatment, gives the following results:

aqueous solution of said polymer treated with ammonia: 1975 m/s, aqueous solution of said polymer not treated: 1090 m/s.

Furthermore, a decrease was observed in the required weight of material used as a bonding or impregnating agent, resulting from the increase in volume of the material by treatment according to the invention, and from the increase in the rigidity of the material obtained by the implementation of the invention.

In particular, in connection with example 1, it was found that the impregnation of cut carbon fibers on the one hand with the product resulting from example 1, and on the other hand with the same aqueous dispersion of "Appretan 9110" not treated with ammonia, results in two diaphragms, made from these two materials, the weights of which for equivalent rigidities are in the ratio of about 1 to 3.

For example, for a diaphragm of 17 cm in diameter, the weight in the case of the application of example 1 is 1.75 g, whereas it is about 2.5 to 5 g for a diaphragm obtained from the starting aqueous dispersion in example 1 not treated with ammonia, or made from commonly—used materials, namely paper, polypropylene or an appropriate composite material.

Thirdly, on listening to loudspeakers made with diaphragms according to the invention and with diaphragms made by another technique, an improvement is observed in the acoustic qualities with the diaphragms according to the invention, due probably, inter alia, to an increase in the internal losses conceivably resulting from a greater ease of relaxation of the macromolecules of "Appretan 9110" that have been treated according to the invention.

B) Examples of applications of gels obtained by implementation of the process according to the invention.

EXAMPLE 3

Using a mother liquor of polyvinyl acetate (dry extract: 50%), a dispersion in water is prepared, containing 20% of mother liquor.

The dilute dispersion thus prepared is used to coat or impregnate a woven or non-woven fabric of nylon fibers, by soaking or coating it with the dilute dispersion thus prepared.

The fabric is dried in hot air to evaporate the water. The fabric is dipped in a bath of ethyl acetate or coated with such a compound.

The ethyl acetate is evaporated, also in hot air.

The diaphragm thus obtained is particularly appropriated for making a diaphragm for an electro-acoustic transducer, particularly for loudspeakers for medium and treble (medium) frequencies.

EXAMPLE 4

A mother liquor made with "Appretan 9110" (dry extract: 32.50%) is diluted in water, at the level of 12% of mother liquor.

Ammonia is added dropwise until a gel is obtained.

The gel thus obtained is mixed with appropriate fibers or fillers (carbon, glass, mica, kevlar, graphite) and conformed.

The form thus obtained is dried with hot air to evaporate the water and ammonia.

EXAMPLE 5

A bath of the same mother liquor of "Appretan 9110" (dry extract: 32.50%) is prepared, diluted in water at the level of 15%, and gelled by the addition of ammonia dropwise.

Carbon fibers are poured into the formed gel and uniformly dispersed therein in a mixer. The homogenized mixture thus obtained is padded under pressure through a sieve which retains the fibers impregnated with gel, which are dried on the sieve with hot air. The form thus obtained is stripped from the sieve.

Since this diaphragm form is not watertight, it is sealed by the application of a coating, such as butyl latex, or by thermo-bonding of a sheet of a waterproof thermoadhesive polymer, such as "Litrex S" (polyether sulfone) made by the company P.C.D.

In all cases, an increase in the sound transmission velocity, a decrease in the density, an increase in rigidity are noted in comparison on the one hand with the use of the same macropolymer or the same mixture of macropolymers that has not been treated by a product producing the formation of a gel or similar material (especially ammonia or ethyl acetate in the above mentioned examples), and on the other hand with the materials commonly used to make diaphragms (paper, polypropylene, composite material etc.).

In the particular case of diaphragms for loudspeakers, a better sound reproduction is obtained, due to the broadening of the passband, the decrease in the mechanical overpressures and the fidelity of reproduction.

As it goes without saying, the invention is not limited to the embodiments or the compounds indicated and specified, especially in the examples, and particularly to the macropolymers, on the one hand, and to the stabilizing liquids, on the other hand, or to the optional additives, but it encompasses the modifications and variations within the grasp of the man skilled in the art, including the means of application of the product obtained in accordance with its purpose for various uses.

I claim:

1. Process for preparing a porous film or diaphragm with improved vibration properties comprising the following steps:

(a) preparing a dispersion in a liquid, of at least one macropolymer containing at least 30,000 atoms, (b) adding to the dispersion an agent capable of expanding said at least one macropolymer so that said dispersion substantially has the consistency of a gel, and (c) drying said dispersion having the consistency of a gel by evaporating substantially all of the liquid contained in said dispersion, thereby obtaining said porous film or diaphragm.

2. The process as claimed in claim 1, wherein said macropolymer is selected from the group consisting of polymers of methacrylic acid, polymers of ethyl acrylate and mixtures of these two polymers.

3. The process as claimed in claim 2, wherein said macropolymer consists of a mixture of about 70% of at least one polymer of methacrylic acid and about 30% of at least one polymer of ethyl acrylate.

4. The process as claimed in claim 2, wherein said agent is a liquid or solid basic agent.

5. The process as claimed in claim 1, wherein said macropolymer is a polyvinyl polymer selected from the group consisting of polymers of vinyl acetate and polymers of vinyl alcohol.

6. The process as claimed in claim 5, wherein said macropolymer is a polyvinyl polymer and wherein said agent is selected from the group consisting of ethyl acetate and tetrahydrofuran.

7. The process as claimed in claim 5, wherein said macropolymer is a polymer of vinyl alcohol and wherein said agent is water.

8. The process as claimed in claim 1, further comprising adding to the gel resulting from step (b), a filler selected from in the group consisting of carbon, ceramic, glass and graphite.

9. The process as claimed in claim 1, further comprising applying said porous film or diaphragm obtained by steps (a) to (c), on fabrics or fiber roves.

10. Porous film or diaphragm with improved vibration properties obtained by the process as claimed in any of the preceding claims.

* * * * *